United States Patent
Moyer

(10) Patent No.: US 10,430,349 B2
(45) Date of Patent: Oct. 1, 2019

(54) SCALED SET DUELING FOR CACHE REPLACEMENT POLICIES

(71) Applicant: Advanced Micro Devices, Inc., Sunnyvale, CA (US)

(72) Inventor: Paul James Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 134 days.

(21) Appl. No.: 15/180,995

(22) Filed: Jun. 13, 2016

(65) Prior Publication Data

US 2017/0357588 A1     Dec. 14, 2017

(51) Int. Cl.
| | |
|---|---|
| *G06F 12/00* | (2006.01) |
| *G06F 12/128* | (2016.01) |
| *G06F 12/0866* | (2016.01) |
| *G06F 12/127* | (2016.01) |
| *G06F 12/0846* | (2016.01) |
| *G06F 12/121* | (2016.01) |
| *G06F 12/123* | (2016.01) |
| *G06F 12/0862* | (2016.01) |
| *G06F 12/0864* | (2016.01) |
| *G06F 12/0811* | (2016.01) |

(52) U.S. Cl.
CPC ........ *G06F 12/128* (2013.01); *G06F 12/0811* (2013.01); *G06F 12/0848* (2013.01); *G06F 12/0862* (2013.01); *G06F 12/0864* (2013.01); *G06F 12/0866* (2013.01); *G06F 12/121* (2013.01); *G06F 12/123* (2013.01); *G06F 12/127* (2013.01); *G06F 2212/1021* (2013.01); *G06F 2212/1024* (2013.01); *G06F 2212/281* (2013.01); *G06F 2212/502* (2013.01); *G06F 2212/601* (2013.01)

(58) Field of Classification Search
None
See application file for complete search history.

(56) References Cited

U.S. PATENT DOCUMENTS

| 6,510,493 B1 | 1/2003 | Liu et al. |
| 2006/0112228 A1* | 5/2006 | Shen .................... G06F 12/084 711/133 |
| 2009/0182951 A1 | 7/2009 | Matick et al. |
| 2012/0102269 A1 | 4/2012 | Ono et al. |

(Continued)

OTHER PUBLICATIONS

International Search Report and Written Opinion issued in Application No. PCT/US2016/052605, dated Feb. 17, 2017, 8 pages.

(Continued)

*Primary Examiner* — Reginald G Bragdon
*Assistant Examiner* — Michael L Westbrook

(57) ABSTRACT

A processing system includes a cache that includes a cache lines that are partitioned into a first subset of the cache lines and a second subsets of the cache lines. The processing system also includes one or more counters that are associated with the second subsets of the cache lines. The processing system further includes a processor configured to modify the one or more counters in response to a cache hit or a cache miss associated with the second subsets. The one or more counters are modified by an amount determined by one or more characteristics of a memory access request that generated the cache hit or the cache miss.

20 Claims, 7 Drawing Sheets

(56) References Cited

U.S. PATENT DOCUMENTS

| | | | |
|---|---|---|---|
| 2012/0260044 A1* | 10/2012 | Beardsley | G06F 12/0804 711/133 |
| 2012/0324172 A1 | 12/2012 | Rabinovitch et al. | |
| 2013/0151778 A1 | 6/2013 | Daly et al. | |
| 2013/0151780 A1* | 6/2013 | Daly | G06F 12/0897 711/122 |

OTHER PUBLICATIONS

International Preliminary Report on Patentability dated Dec. 27, 2018 for corresponding International Application No. PCT/US2016/052605, 7 pages.

* cited by examiner

SCALED SET DUELING FOR CACHE REPLACEMENT POLICIES

BACKGROUND

Field of the Disclosure

The present disclosure relates generally to processing systems and, more particularly, to configuring cache replacement policies in processing systems.

Description of the Related Art

Processing systems store copies of information from memory elements such as dynamic random access memories (DRAMs) in caches that can be accessed more rapidly (e.g., with lower latency) by processing units in the processing system. Entries in the cache are referred to as cache lines, which may be indicated by an index and a way in associative caches. The caches can be organized in a hierarchy of caches that includes faster, but relatively smaller, lower level caches such as an L1 cache and slower, but relatively larger, higher level caches such as an L2 cache. The caches may be inclusive so that all data stored in the lower level caches is also stored in a higher level cache. Memory access requests are initially directed to the lowest level cache. If the request hits a cache line in the lowest level cache, data in the cache line is returned to the requesting processing unit. If the request misses in the lower level cache, the request is sent to the next higher level cache. If the request hits a cache line in the higher level cache, data in the higher level cache line is returned to the requesting processing unit. Otherwise, the request is sent to the next higher level cache or the main memory. Data that is retrieved from a higher-level cache (or main memory) in response to a cache miss in a lower level cache is also stored in a cache line of the lower level cache. If the lower level cache is full, one of the cache lines in the lower level cache is evicted to make room for the new data.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
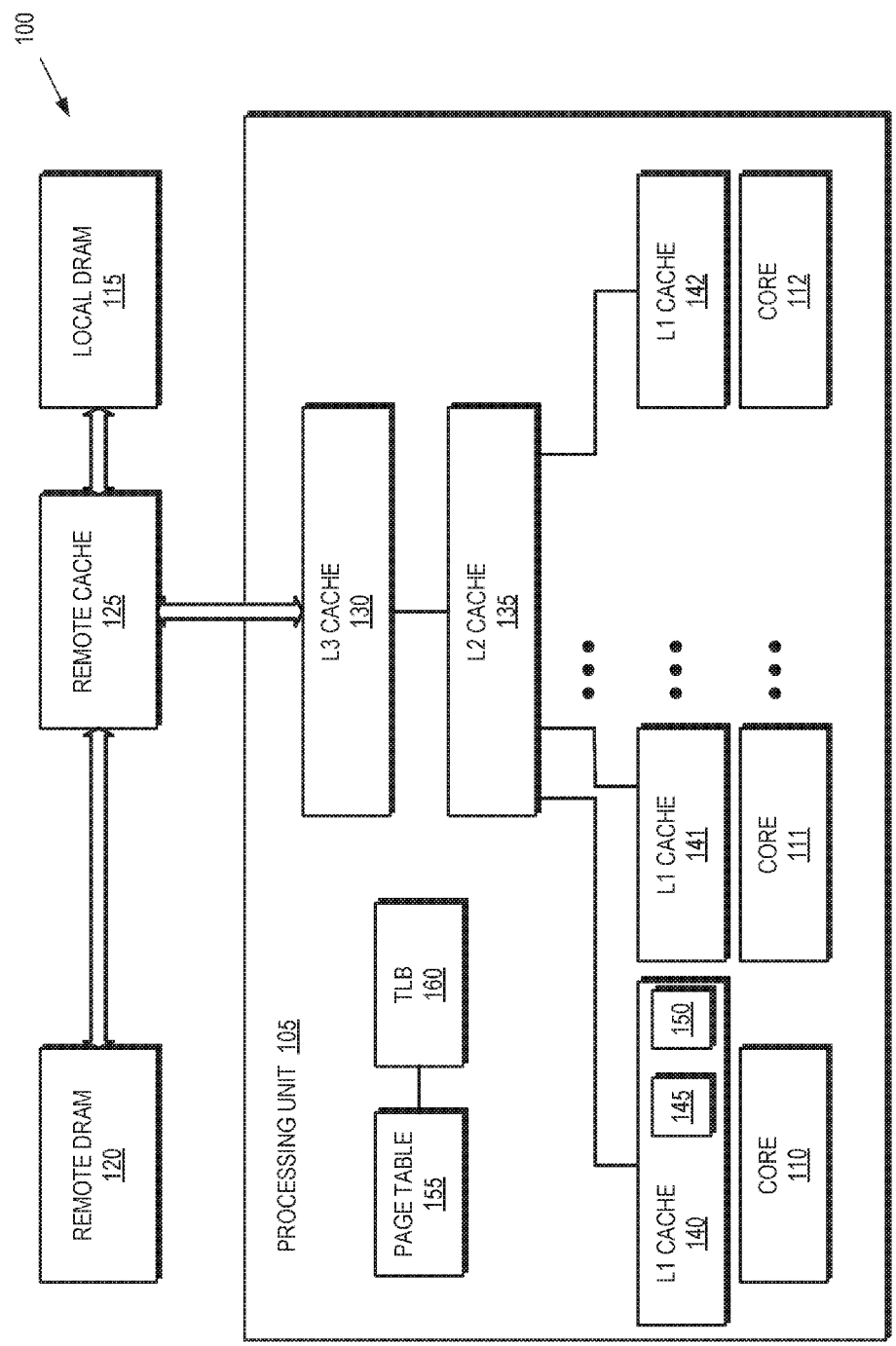
FIG. 1 is a block diagram of a processing system according to some embodiments.

Cache replacement policies are used to determine which cache lines should be evicted. For example, a least recently used (LRU) cache replacement policy keeps track of when each cache line was used and evicts the least recently used cache line to make room for new data in the event of a cache miss. For another example, re-reference interval prediction (RRIP) is used to predict the likelihood that the data in a cache line will be used in the future. Caches that implement RRIP associate an N-bit value with each cache line. The N-bit value for a cache line is set to an initial value (e.g., 1 or 2) when new data is inserted in the cache line. The N-bit value for the cache line may then be decremented (or set to 0) in response to a hit and the N-bit values for the other cache lines are incremented in response to the hit. Cache lines with higher N-bit values are less likely to be used in the future than cache lines with lower N-bit values. The cache line with the highest N-bit value may therefore be evicted in response to a cache miss if the cache is full. Different cache replacement policies may be more effective (e.g., generate higher hit rates or lower miss rates) for different applications. For example, the LRU replacement policy may result in higher hit rates (relative to RRIP) for one application and the RRIP replacement policy may result in higher hit rates (relative to LRU) for another application. For another example, the RRIP replacement policy may produce higher hit rates when configured to use an initial N-bit value of 1 or an initial N-bit value of 2, depending on the application.

Set-dueling may be used to dynamically select cache replacement policies based on monitored hit rates or miss rates for subsets of the cache that are configured to use different cache replacement policies. For example, performance of two subsets is monitored by incrementing a counter in response to a cache hit in the first subset and decrementing the counter in response to a cache hit in the second subset. The value of the counter is then used to select the policy associated with the first subset or the second subset and the selected policy is used to configure the cache. For example, a first subset of cache lines in a cache that implements the RRIP replacement policy initializes the N-bit values of newly inserted cache lines to 1 and a second subset of the cache lines initializes the N-bit values of newly inserted cache lines to 2. The system modifies a counter in response to cache hits in the first and second subsets and then selectively uses the N-bit value of 1 or 2 to initialize the N-bit values of newly inserted cache lines for the cache based on the value of the counter after a predetermined time interval. However, conventional set dueling algorithms do not account for the different impact of different types of operations on the overall performance or the different latency penalties for misses by different types of operations.

The performance of a cache may be improved by performing set dueling between subsets of cache lines in the cache that implement different cache replacement policies. In response to cache hits or cache misses associated with different subsets, one or more counters are modified by values determined based on the type of operation that issued the memory access request that generated the cache hit or cache miss. For example, instead of incrementing the counter by 1 for all cache hits associated with a first subset (or decrementing the counter by 1 for all cache hits associated with a second subset), cache hits generated by more speculative operations such as prefetches increment or decrement the counter by 1, cache hits by less speculative operations such as hits in an instruction cache or a data cache increment or decrement the counter by 2, and cache hits to a translation lookaside buffer that trigger page table walks increment or decrement the counter by 3.

In some embodiments, the value used to modify the counter is also determined based on a latency penalty for a cache miss. For example, the counter may be decremented by 1 in response to a cache miss associated with a first subset in a current level of the cache (and incremented by 1 in response to a cache miss associated with a second subset of the current level) if the memory access request hits in the next level of the cache. The counter may be decremented by 2 in response to the cache miss associated with the first subset (and incremented by 2 in response to the cache miss associated with the second subset) if the memory access request misses in the next level of the cache and hits in a remote cache. The counter may be decremented by 3 in response to the cache miss associated with the first subset (and incremented by 3 in response to the cache miss associated with the second subset) if the memory access request misses in the remote cache and is read in a memory.

Modifying the incremental values based on latency significantly improves the performance of the cache if increasing latency has a significant performance impact. However, in some cases the system is bandwidth limited and the absolute number of cache misses should be minimized because each cache miss consumes additional bandwidth to move data from a higher level cache (or memory) into the lower level cache where the miss occurred. In some embodiments, lower level cache and memory bandwidth feedback is therefore used to select between scaling the incremental values or treating all cache misses equally to minimize the overall number of cache misses if the system is bandwidth limited.

FIG. 1 is a block diagram of a processing system 100 according to some embodiments. The processing system 100 may be implemented as a standalone device or as part of a system-on-a-ship (SOC). The processing system 100 includes a processing unit 105. Examples of processing units 105 include central processing units (CPUs), graphics processing units (GPUs), accelerated processing units (APUs), application-specific integrated circuits (ASICs), field programmable gate arrays (FPGAs), and the like. The processing unit 105 includes a plurality of processor cores 110, 111, 112 (collectively referred to herein as "the cores 110-112") that are configured to execute instructions or manipulate data independently, concurrently, or in parallel. The cores 110-112 may also be referred to as compute units or using similar terms.

The processing system 100 includes a main memory that may be implemented as dynamic random access memory (DRAM). In the illustrated embodiment, the main memory is distributed across multiple sockets in the processing system 100. A local DRAM 115 is implemented in the same socket as the processing unit 105 and one or more remote DRAM 120 are implemented in a different socket than the processing unit 105. Thus, the latency of memory accesses to the local DRAM 115 is typically shorter than the latency for memory access requests to the remote DRAM 120.

The processing system 100 also implements a hierarchical (or multilevel) cache system that is used to speed access to instructions or data that are stored in the local DRAM 115 or the remote DRAM 120 by storing copies of the instructions or data in the caches. The hierarchical cache system depicted in FIG. 1 is intended as an example of a hierarchical cache system that implements some embodiments of the set dueling techniques described herein. However, some embodiments of hierarchical cache systems implemented in the processing system 100 differ from the hierarchical cache system depicted in FIG. 1. For example, other hierarchical cache systems that implement some embodiments of the set dueling techniques described herein may include more or fewer numbers of caches, more or fewer layers of caches, or other hierarchical arrangements of caches. Furthermore, the caches may or may not be implemented on the same substrate, wafer, or die as the processing unit 105.

The hierarchical cache system includes a remote cache 125 that is implemented on the same socket as the processing unit 105 and the local DRAM 115 but is not on the same substrate, wafer, or die as the processing unit 105. The remote cache 125 may also be referred to as a layer 4 (L4) cache. The cache lines are identified by a combination of an index and a way. Some embodiments of the remote cache 125 are associative to the local DRAM 115 or the remote DRAM 120 so that each line in the local DRAM 115 or the remote DRAM 120 can potentially be copied to more than one cache line (or way) in the remote cache 125. Examples of associativities of the remote cache 125 include 2-way associativity, 4-way associativity, 8-way associativity, 16-way associativity, direct mapping, fully associative caches, and the like. Relative to the local DRAM 115 or the remote DRAM 120, the remote cache 125 is implemented using faster memory elements. The remote cache 125 may also be deployed logically or physically closer to the cores 110-112 (relative to the DRAM 115, 120) so that information is exchanged between the cores 110-112 and the remote cache 125 more rapidly or with less latency.

The processing unit 105 implements a level 3 (L3) cache 130 for storing copies of instructions or data that are stored in the remote cache 125. The cache lines are identified by a combination of an index and a way. Some embodiments of the L3 cache 130 are associative to the remote cache 125 so that each line in the remote cache 125 can potentially be copied to and from more than one way associated with each index in the L3 cache 130. Relative to the remote cache 125, the L3 cache 130 are implemented using faster memory elements. The L3 cache 130 may also be deployed logically or physically closer to the cores 110-112 (relative to the remote cache 125) so that information is exchanged between the cores 110-112 and the L3 cache 130 more rapidly or with less latency.

The hierarchical cache system also includes a level 2 (L2) cache 135 for storing copies of instructions or data that are stored in the L3 cache 130. The cache lines are identified by a combination of an index and a way. Some embodiments of the L2 cache 135 are associative to the L3 cache 130 so that each line in the L3 cache 130 can potentially be copied to and from more than one way associated with each index in the L2 cache 135. Relative to the L3 cache 130, the L2 cache 135 are implemented using faster memory elements. The L2 cache 135 may also be deployed logically or physically closer to the cores 110-112 (relative to the L3 cache 130) so that information is exchanged between the cores 110-112 and the L2 cache 135 more rapidly or with less latency.

The hierarchical cache system also includes a level 1 (L1) caches 140, 141, 142, which are collectively referred to herein as "the L1 caches 140-142." Each of the L1 caches 140-142 is associated with a corresponding one of the cores 110-112 and stores copies of instructions or data for use by the corresponding one of the cores 110-112. Relative to the L2 cache 135, the L1 caches 140-142 are implemented using faster memory elements so that information stored in the cache lines of the L1 caches 140-142 can be retrieved more rapidly by the corresponding cores 110-112. The L1 caches 140-142 may also be deployed logically or physically closer to the corresponding cores 110-112 (relative to the L2 cache 135) so that information is exchanged between the cores 110-112 and the L1 caches 140-142 more rapidly or with less latency (relative to communication with the L2 cache 135). Some embodiments of the L1 caches 140-142 are partitioned into instruction caches 145 that store copies of instructions and data caches 150 that store copies of data. In the interest of clarity, the instruction cache 145 and the data cache 150 are only shown in the L1 cache 140. However, the L1 caches 141, 142 may also include instruction and data caches.

Some embodiments of the higher level caches are inclusive of one or more of the lower level caches. For example, the L2 cache 135 may be inclusive of the L1 caches 140-142 so that cache lines stored in the L1 caches 140-142 also stored in the L2 cache 135.

In operation, the processor cores 110-112 send memory access requests to the corresponding L1 caches 140-142 to request access to copies of instructions or data that are stored in the L1 caches 140-142. If the requested information is stored in the corresponding cache, e.g., as indicated by a match between an address or a portion of an address in the memory access request and a cache tag associated with a cache line in the cache, the processor core is given access to the cache line. This is conventionally referred to as a cache hit. If the requested information is not stored in any of the cache lines of the corresponding cache, which is conventionally referred to as a cache miss, the memory access request is forwarded to the L2 cache 135. If the memory access request hits in the L2 cache 135, the processor core is given access to the cache line in the L2 cache 135. If the memory access request misses in the L2 cache 135, the memory access request is forwarded to the L3 cache 130. The process is iterated at progressively higher levels of the cache until a cache hit occurs or the requested information is accessed in the DRAM 115, 120.

Cache lines in the remote cache 125, the L3 cache 130, the L2 cache 135, or the L1 caches 140-142 may be replaced in response to a cache miss. For example, if a memory access request misses in the L1 cache 140 and hits in the L2 cache 135, the instruction or data stored in the accessed cache line of the L2 cache 135 is copied to a cache line in the L1 cache 140 so that it is available for subsequent memory access requests by the corresponding core 110. The requesting core 110 then accesses the cache line in the corresponding L1 cache 140. Information that was previously stored in one of the cache lines is evicted to make room for the new information if all of the cache lines are currently storing information. Cache lines are selected for eviction based on a replacement policy. Some embodiments of the L2 cache 135 and the L1 caches 140-142 implement a replacement policy that is based on re-reference interval prediction (RRIP). For example, each cache line in the L2 cache 135 and the L1 caches 140-142 is associated with an N-bit value that is set to an initial value (e.g., 1 or 2) when new data is inserted in the cache line. The N-bit value for the cache line is decremented (or set to 0) in response to a hit and the N-bit values for the other cache lines are incremented in response to the hit. The cache line with the highest N-bit value is evicted in response to a cache miss if the cache is full.

The processing unit 105 also includes a page table 155 and a translation lookaside buffer (TLB) 160 that are used to implement virtual memory in the processing system 100. The page table 155 is a data structure that stores a mapping between virtual addresses and physical addresses. The virtual addresses are used by the cores 110-112 to access memory locations indicated by the physical addresses. The TLB 160 is a cache that stores copies of the mappings of a subset of the virtual addresses to the corresponding physical addresses. The cores 110-112 send requests to the TLB 160 to access the mapping of a virtual address to a physical address. A TLB hit occurs if the virtual-to-physical address mapping is stored in the TLB 160. Otherwise, a TLB miss occurs and the request is directed to the page table 155. A page table walk is performed to locate the requested mapping of the virtual physical address to the physical address in the page table 155.

Different cache replacement policies can be used to select cache lines for eviction from the caches including the remote cache 125, the L3 cache 130, the L2 cache 135, the L1 caches 140-142, the instruction cache 145, the data cache 150, or the TLB 160. For example, a cache may use an LRU cache replacement policy or an RRIP cache replacement policy. For another example, the cache may use an RRIP cache replacement policy that is configured to use different initial N-bit values for new cache lines, different maximum N-bit values, and the like. The cache replacement policy used by the caches is dynamically determined using set dueling techniques. Some embodiments of the caches are partitioned into a main portion and two or more subsets of cache lines. The subsets of the cache lines operate according to different cache replacement policies. One of the cores 110-112 can modify one or more counters associated with the subsets in response to cache hits or cache misses associated with the subsets. For example, a counter associated with a first subset and a second subset can be incremented in response to a cache hit to the first subset and decremented in response to a cache hit to the second subset. The amount of modification to the counter for each cache hit or cache miss is determined by a characteristic of a memory access request that generated the cache hit or the cache miss. Examples of characteristics of the memory access request include a type of the memory access request, a degree of speculation associated with the type of memory access request, a latency associated with the cache miss, and the like. The cache replacement policy used by the main portion of the cache can then be dynamically configured to operate according to one of the policies implemented by the first and second subsets based on the value of the counter, as discussed herein.

Figure 2:
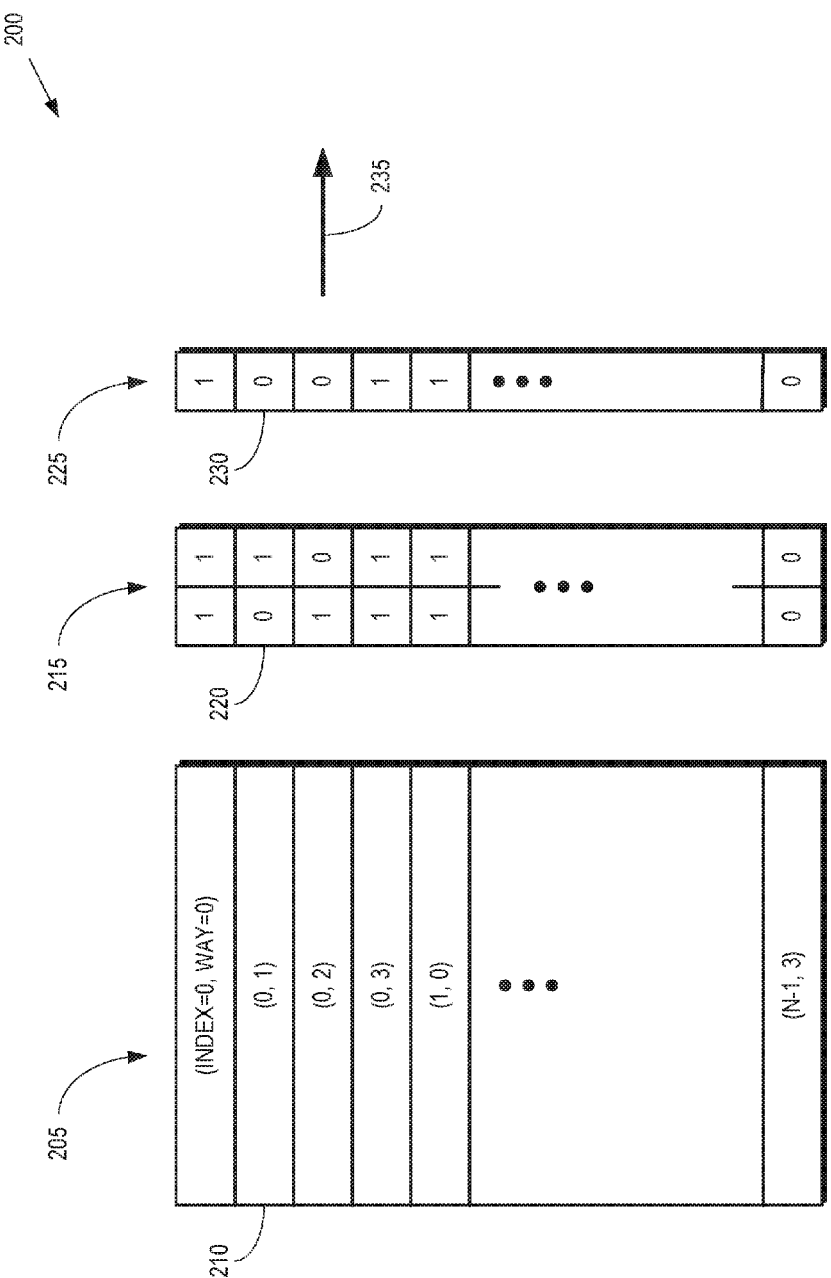
FIG. 2 is a block diagram of an inclusive cache according to some embodiments.

FIG. 2 is a block diagram of an inclusive cache 200 according to some embodiments. The inclusive cache 200 is used to implement some embodiments of the remote cache 125, the L3 cache 130, or L2 cache 135 shown in FIG. 1. The inclusive cache 200 includes a set 205 of cache lines 210 (only one cache line is indicated by a reference numeral in the interest of clarity). The illustrated embodiment of the inclusive cache 200 is 4-way associative so that the cache lines are indicated by an index (0, N−1) and a way (0, 3). However, other embodiments of the inclusive cache 200 may have other associativities.

The inclusive cache 200 also includes an array 215 of N-bit values 220 associated with each of the cache lines 210. Only one of the N-bit values 220 is indicated by a reference numeral in the interest of clarity. The N-bit values 220 shown in FIG. 2 include two bits to represent values in the range 0-3 but other embodiments may use more or fewer bits to represent larger or smaller ranges of values. The N-bit value 220 for a cache line 210 is set to an initial value when new data is inserted in the cache line. For example, the N-bit value 220 for the cache line 210 indicated by index 0 and way 1 is initialized to a value of 1 by setting the first bit to 0 and the second bit to 1. The N-bit value 220 for a cache line 210 is decremented in response to a hit at the cache line 210. For example, the N-bit value 220 for the cache line 210 indicated by index N−1 and way 3 is set to a value of 0 by setting the first bit to 0 and the second bit to 0. The N-bit values for the other cache lines are incremented in response to the hit. As discussed herein, the amount that the N-bit value 220 is incremented or decremented is determined based on a characteristic of the memory access request that generates the cache hit or cache miss that causes the N-bit value 220 to be incremented or decremented.

The inclusive cache 200 also maintains state information 225 that indicates whether each of the cache lines 210 is included in one or more lower level caches, such as the L1 caches 140-142 shown in FIG. 1. The state information 225 includes bits 230 that are set to one value (e.g., a value of 1) to indicate that the corresponding cache line is included in a lower level cache and a different value (e.g., a value of 0) to indicate that the corresponding cache line is not included in a lower level cache. For example, the value of the bit 230 associated with the cache line 210 indicated by the index of 0 and the way of 0 is set to a value of 1 to indicate that the corresponding cache line is included in one or more lower level caches. For another example, the value of the bit 230 associated with the cache line 210 indicated by the index of 0 and the way of 1 is set to a value of 0 to indicate that the corresponding cache line is not included in one or more lower level caches.

Cache lines 210 are selected for eviction (e.g., in response to a cache miss to the cache 200) based on the N-bit values 230 in the array 215. For example, cache lines having a maximum N-bit value of 3 may be selected for eviction from the cache 200 in response to a cache miss. However, evicting a cache line 210 from the cache 200 requires evicting one or more cache lines from one or more lower level caches if the cache line 210 is inclusive of a cache line in one or more of the lower level caches. Thus, in some embodiments, cache lines having a lower N-bit value are considered for eviction if all of the cache lines having the maximum N-bit value are inclusive of cache lines in one or more lower level caches. For example, the cache lines 210 indicated by the index/way combinations (0, 0), (0, 3), and (1, 0) have N-bit values 220 that are equal to the maximum N-bit value, but all of these cache lines 210 are inclusive of one or more lower level cache lines, as indicated by the value of 1 in the corresponding bits 230 of the state information 225. Cache lines having lower N-bit values 220 are therefore considered for eviction. For example, the cache line 210 indicated by the index/way combination (0, 2) has a N-bit value equal to a threshold value of 2 and may therefore be evicted from the cache 200, as indicated by the arrow 235. The threshold N-bit value for considering cache lines for eviction may be set dynamically, e.g., using set dueling techniques as discussed herein.

Figure 3:
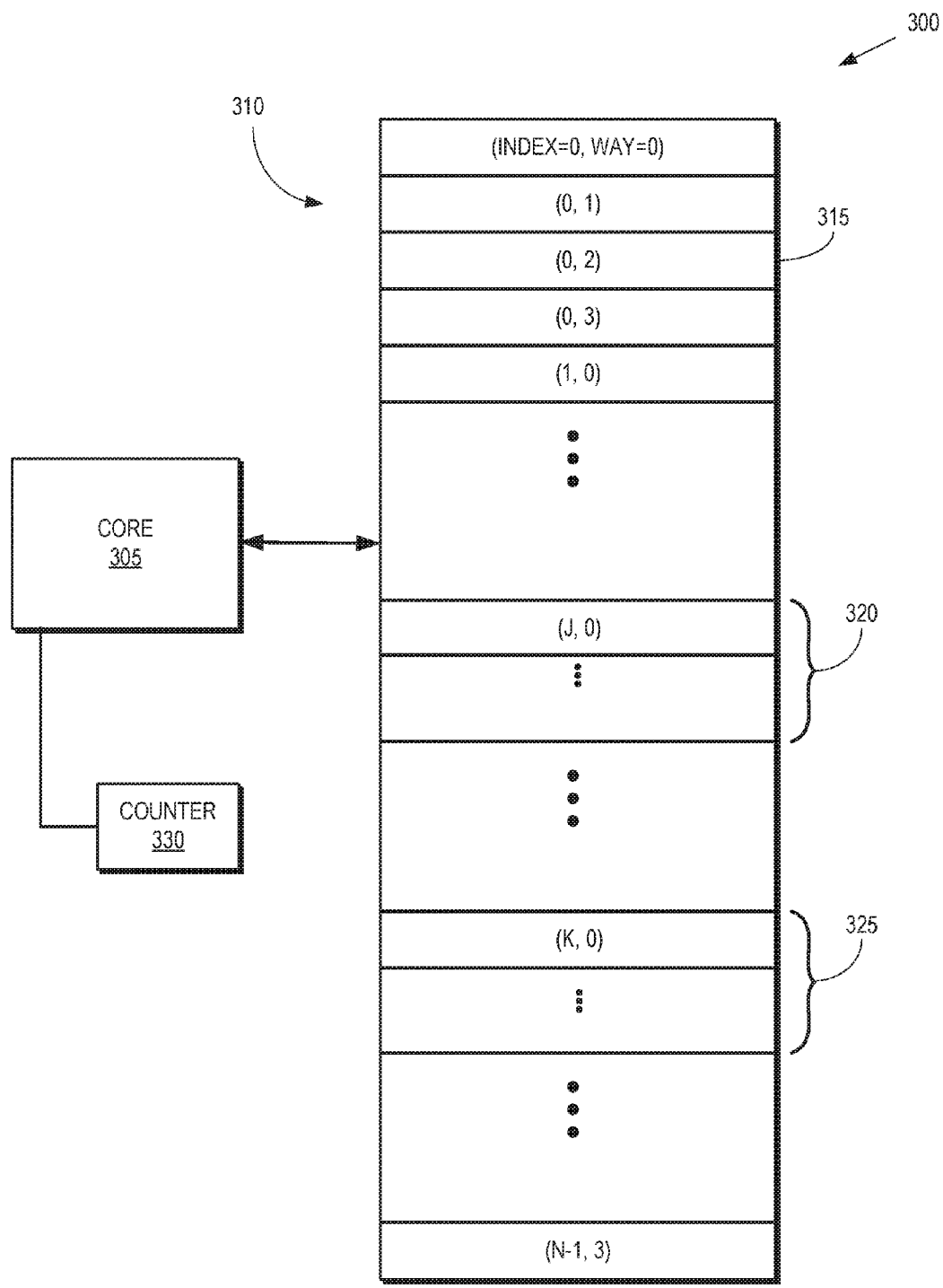
FIG. 3 is a block diagram of a processing system that implements set dueling to configure cache replacement policies according to some embodiments.

FIG. 3 is a block diagram of a processing system 300 that implements set dueling to configure cache replacement policies according to some embodiments. The processing system 300 is used to implement portions of some embodiments of the processing system 100 shown in FIG. 1. The processing system includes a core 305 and a cache 310. The core 305 is used to implement some embodiments of the cores 110-112 and the cache 310 is used to implement some embodiments of the remote cache 125, the L3 cache 130, the L2 cache 135, the L1 caches 140-142, the instruction cache 145, or the data cache 150 shown in FIG. 1. The illustrated embodiment of the cache 310 includes N indexes and is 4-way associative so that the identifiers of the individual cache lines 315 (only one indicated by a reference numeral in the interest of clarity) range from (0, 0) to (N−1, 3). However, other associativities may be used in other embodiments of the cache 310.

The cache 310 is partitioned into a first subset 320, a second subset 325, and the remainder of the cache lines, which are referred to as the main portion of the cache 310. In some embodiments, the cache lines in the first subset 320 and the second subset 325 are identified by indices of the corresponding cache lines. For example, the first subset 320 includes the cache lines associated with the index J and the second subset 325 includes the cache lines associated with the index K. However, the cache lines in the first and second subsets may also be partitioned on the basis of other identifiers of the cache lines 315. Moreover, some embodiments of the cache 310 may be partitioned into additional subsets.

A counter 330 is associated with the first subset 320 and the second subset 325. The value of the counter 330 is modified by the core 305 in response to cache hits to the first subset 320 or the second subset 325. For example, the core 305 increments the counter 330 in response to a cache hit in the first subset 320 and decrements the counter 330 in response to a cache hit in the second subset 325. Thus, the value of the counter 330 increases in response to cache hits in the first subset 320 and decreases in response to cache hits in the second subset 325. The number of cache hits is a measure of the relative effectiveness of the cache replacement policies implemented by the subsets 320, 325. Thus, by monitoring the value of the counter 330, the core 305 can determine which of the cache replacement policies is more effective under the current operating conditions of the processing system 300. The core 305 then configures the main portion of the cache 310 to operate according to the most effective cache replacement policy.

Some embodiments of the core 305 modify the value of the counter 330 in response to cache misses associated with the first subset 320 or the second subset 325. Although a cache miss by itself is not associated with a particular cache line, a cache miss may be associated with the first subset 320 or the second subset 325 based on a cache hit in a higher level cache or the location in a main memory such as a DRAM. For example, each index in a lower level cache maps to a particular set of indices in the higher level caches (or locations in the main memory). The first subset 320 and the second subset 325 are therefore mapped to different sets of indices in the higher level caches or different locations in the main memory. A cache hit in one of the higher level caches (or an access to the main memory) causes the information at the location of the cache hit to be copied to a way of the index in the lower level cache that is mapped to the index of the cache hit in the higher level cache. The core 305 associates a cache miss with the first subset 320 or the second subset 325 in response to information being copied into a way of the first subset 320 or the second subset 325. The core 305 decrements the counter 330 in response to a cache miss associated with the first subset 320 and increments the counter 330 in response to a cache miss associated with the second subset 325. Some embodiments of the core 305 may increment or decrement the counter 330 in response to both cache hits and cache misses associated with the first subset 320 and the second subset 325.

Some embodiments of the counter 330 depicted in FIG. 3 represent more than one counter. For example, instead of incrementing or decrementing a single counter 330, the core 305 maintains separate counters for the first subset 320 and the second subset 325. The separate counters are incremented or decremented in response to cache hits or cache misses associated with the respective first subset 320 or second subset 325. The values of the separate counters can then be compared to identify the most effective cache replacement policy. For another example, the cache 310 is partitioned into more than two subsets that are configured to operate according to more than two different cache replacement policies. A corresponding set of counters is therefore defined to allow the core 305 to identify the most effective cache replacement policy based on cache hits or cache misses associated with the set of counters.

The core 305 modifies the value of the counter 330 by different amounts depending on characteristics of the memory access request that generated the cache hit or the cache miss. Characteristics of the memory access request include a type of the request such as a prefetch request, a demand request, an instruction cache request, a data cache request, a table walk request, a load request, a store request, privilege levels associated with the requests, and the like. Different types of operations may have different degrees of speculation. Prefetch requests that hit a line in the cache 310 have a relatively high degree of speculation, demand requests have a lower degree of speculation, hits in a cache that originated from cache misses to an instruction cache have a still lower degree of speculation, hits in a cache that originated from cache misses to a data cache have a still lower degree of speculation, and misses by a TLB page table walker, which causes the processing system to perform a hardware page table walk using a memory access request, have a yet lower degree of speculation. Hits or misses associated with requests that have higher degrees of speculation result in smaller changes to the value of the counter 330. Characteristics of the memory access requests also include different latencies in fulfilling the memory access requests following a cache miss. For example, the latency associated with memory access request that misses in a lower level and hits in the next higher level cache is lower than the latency that results if the memory access request misses in the lower level cache, misses in the next higher level cache, and is then directed to an external DRAM to fulfill the memory access request. Cache misses associated with requests that produce more latency may result in smaller changes to the value of the counter 330.

Figure 4:
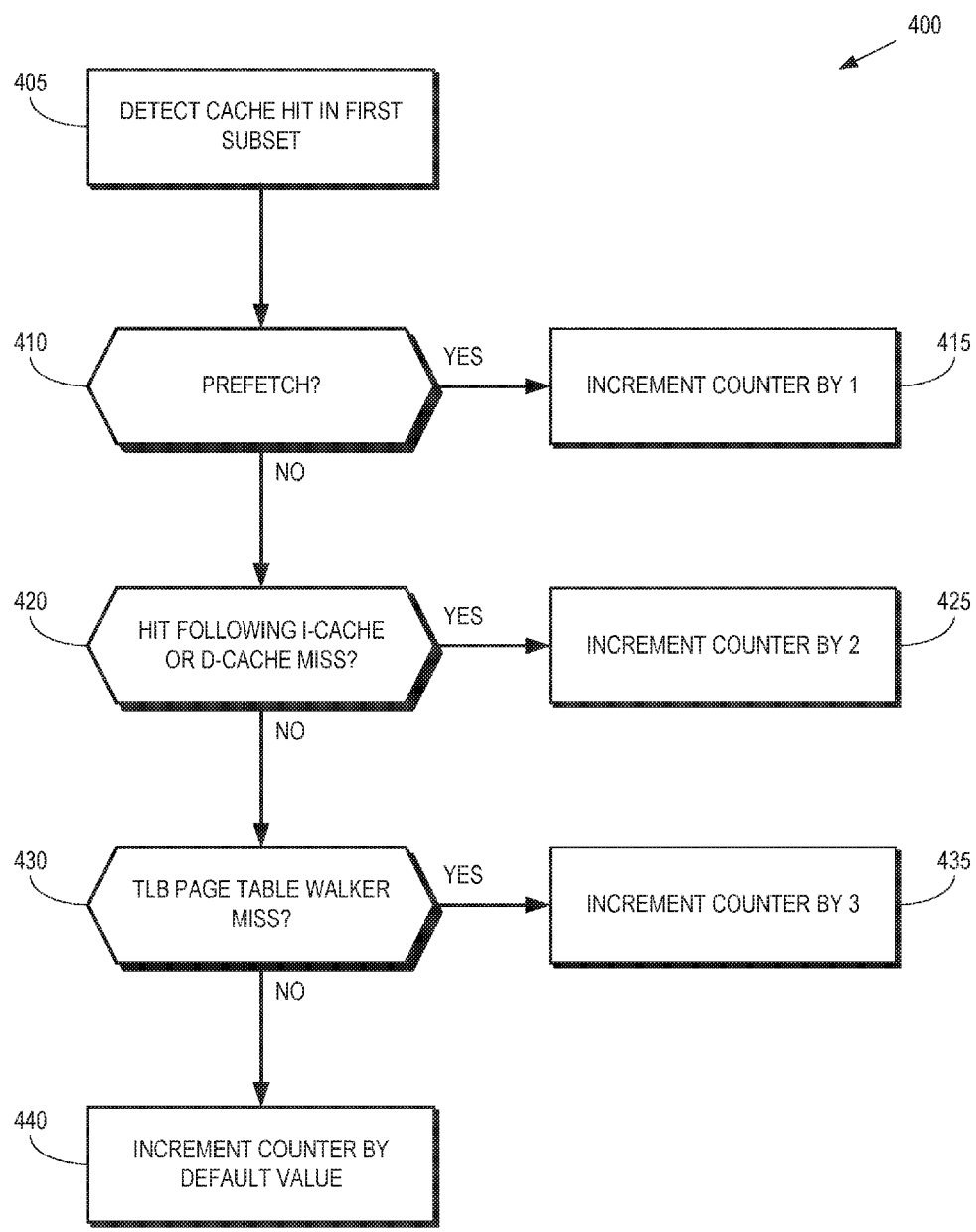
FIG. 4 is a flow diagram of a method of selecting an incremental value based on a type of a memory access request that generated a cache hit in a subset of a cache according to some embodiments.

FIG. 4 is a flow diagram of a method 400 of selecting an incremental value based on a type of a memory access request that generated a cache hit in a subset of a cache according to some embodiments. The method 400 is implemented in some embodiments of the processing system 100 shown in FIG. 1 or the processing system 300 shown in FIG. 3. The particular types of memory access requests and the corresponding incremental values illustrated in the method 400 are intended as examples to illustrate the use of different incremental values to modify counters in set dueling algorithms. Some embodiments of the method 400 use different types of memory access requests or different incremental values. Furthermore, some embodiments of the method 400 are used to determine values for decrementing counters in response to cache hits in other subsets of the cache. For example, the incremental values determined by the method 400 for one subset of the cache correspond to the values used to decrement the counters in response to cache hits in other subsets of the cache.

At block 405, a processor core detects a cache hit in a first subset of a cache. The cache hit is produced in response to a memory access request and the processor core determines the type of the memory access request using information provided with the memory access request or other information available from the processing system. The processor core increments the value of a counter such as the counter 330 shown in FIG. 3, by an amount that is determined based on the type of the memory access request.

At decision block 410, the processor core determines whether the memory access request is a prefetch request for information that is expected to be needed for execution of subsequent instructions by the processor core. Prefetch requests have a high degree of speculation. If the memory access request is a prefetch request, the processor core increments the counter by an incremental value of 1 at block 415. If the memory access request is not a prefetch request, the method 400 flows to decision block 420.

At decision block 420, the processor core determines whether the memory access request is a request to an instruction cache or a data cache. Requests to the instruction cache or the data cache have a lower degree of speculation than prefetch requests. If the request is to the instruction cache or the data cache, the processor core increments the counter by an incremental value of 2 at block 425. If the memory access request is not to the instruction cache or the data cache, the method 400 flows to decision block 430.

At decision block 430, the processor core determines whether the memory access request is caused by a miss to the TLB by the TLB page table walker. Requests that result from misses by the TLB page table walker have a low degree of speculation relative to prefetch requests or requests to the instruction/data cache. If the request produced a cache miss by the TLB page table walker, the processor core increments the counter by an incremental value of 3 at block 435. If the cache hit was not produced by a TLB page table walker miss, the processor core increments the counter by a default value. The default value is set to a relatively low level if the uncategorized types are expected to have high degrees of speculation or to a relatively high level of the uncategorized types are expected to have low degrees of speculation.

Figure 5:
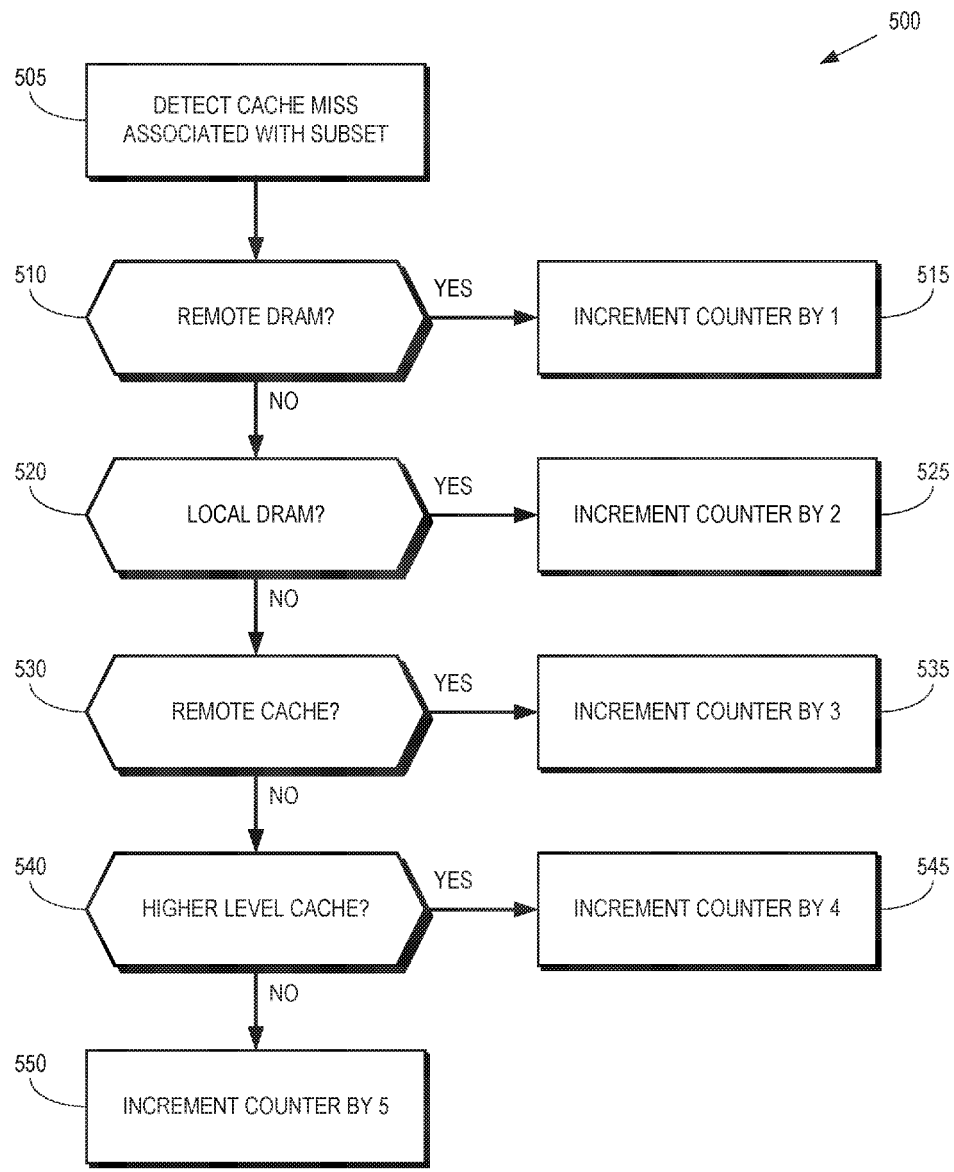
FIG. 5 is a flow diagram of a method of selecting an incremental value based on a latency for a cache miss associated with a subset of cache lines in a cache according to some embodiments.

FIG. 5 is a flow diagram of a method 500 of selecting an incremental value based on a latency for a cache miss associated with a subset of cache lines in a cache according to some embodiments. The method 500 is implemented in some embodiments of the processing system 100 shown in FIG. 1 or the processing system 300 shown in FIG. 3. The particular latencies and the corresponding incremental values illustrated in the method 500 are intended as examples to illustrate the use of different incremental values to modify counters in set dueling algorithms. Some embodiments of the method 500 consider different latencies, latency categories, or different incremental values. Furthermore, some embodiments of the method 500 are used to determine values for decrementing counters in response to cache misses associated with other subsets of the cache. For example, the incremental values determined by the method 500 correspond to the values used to decrement the counters in response to cache hits in other subsets of the cache.

At block 505, a processor core detects a cache miss associated with the subset of lines of the cache. The processor core then determines a latency associated with the cache miss. For example, the processor core receives information such as an encoding that identifies the data source for the information that is returned to the cache in response to the cache miss. The encoding indicates an L1 cache hit, an L2 cache hit, an L3 cache hit, a response from a local DRAM, a response from a remote DRAM, a response from a remote cache, and the like. The encoding is therefore used to estimate the latency or categorize the latency for the cache miss.

At decision block 510, the processor core determines whether the data source for the returned information is a remote DRAM. The latency associated with the remote DRAM is relatively large. If the data source is the remote DRAM, the processor core increments the counter by a relatively low value of 1 at block 515. If the data source is not the remote DRAM, the method 500 flows to decision block 520.

At decision block 520, the processor core determines whether the data source for the returned information is a local DRAM. The latency associated with the local DRAM is smaller than the latency associated with the remote DRAM. If the data source is the local DRAM, the processor core increments the counter by a value of 2 at block 515. If the data source is not the local DRAM, the method 500 flows to decision block 530.

At decision block 530, the processor core determines whether the data source for the returned information is a remote cache. The latency associated with the remote cache is smaller than the latency associated with the local DRAM. If the data source is the remote cache, the processor core increments the counter by a value of 3 at block 535. If the data source is not the remote cache, the method 500 flows to decision block 540.

At decision block 540, the processor core determines whether the data source for the returned information is a higher level local cache. The latency associated with the higher level local cache is lower than the latency associated with the remote cache. If the data source is the higher level local cache, the processor core increments the counter by a value of 4 at block 545. If the data source is not the higher level local cache, the processor core assumes that the latency is lower than the latency associated with the higher level local cache and increments the counter by a value of 5 at block 550.

Figure 6:
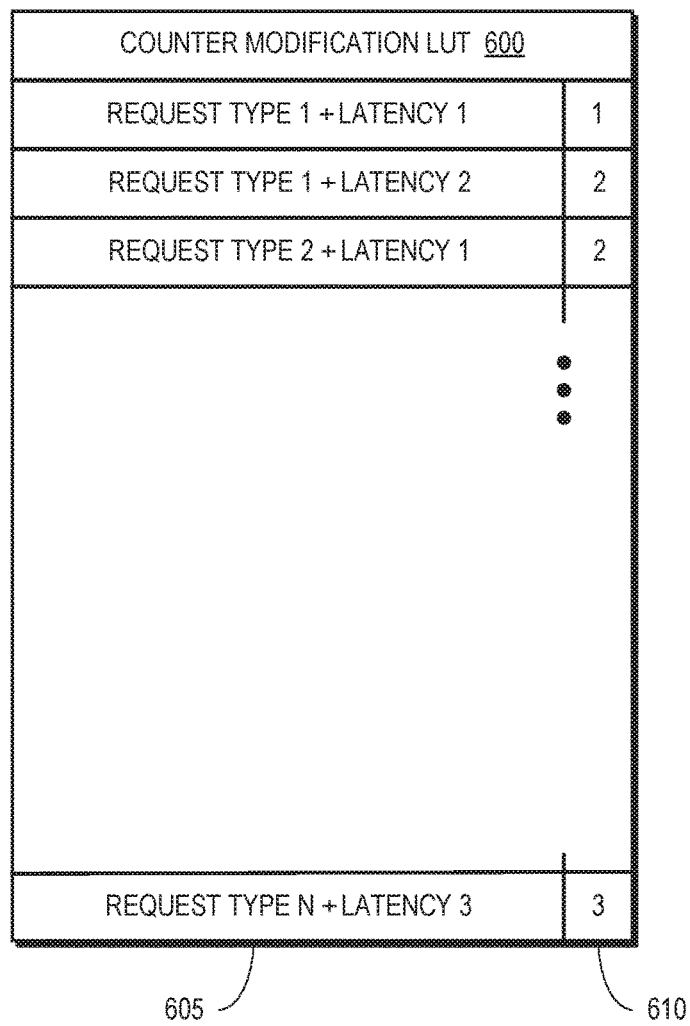
FIG. 6 is a diagram of a counter modification lookup table (LUT) for looking up incremental values for a set dueling counter based on a memory access request type and latency according to some embodiments.

FIG. 6 is a diagram of a counter modification lookup table (LUT) 600 for looking up incremental values for a set dueling counter based on a memory access request type and latency according to some embodiments. The counter modification LUT 600 is used to identify incremental values for a set dueling counter in some embodiments of the processing system 100 shown in FIG. 1 or the processing system 300 shown in FIG. 3. The counter modification LUT 600 includes a first column 605 that includes fields that hold values that indicate a combination of a memory access request type and a latency for the memory access request. The counter modification LUT 600 also includes a second column 610 that includes fields that hold values that indicate a corresponding incremental (or decremental) value that is used to modify values of a set dueling counter, as discussed herein.

Processor cores such as the cores 110-112 shown in FIG. 1 use the counter modification LUT 600 to identify incremental values based on the request type and latency associated with a memory access request that generates a cache hit or a cache miss associated with a subset of a cache that is used for set dueling, e.g. to compare the effectiveness of different cache replacement policies. For example, if the processor core detects a cache hit to a first subset that is produced by a memory request of type 1 that has a latency of 1, the processor core increments the appropriate counter by a value of 1, as indicated by the counter modification LUT 600. For another example, if the processor core detects a cache hit to a second subset that is produced by memory request of type 1 that has a latency of 1, the processor core decrements the appropriate counter by a value of 1.

Figure 7:
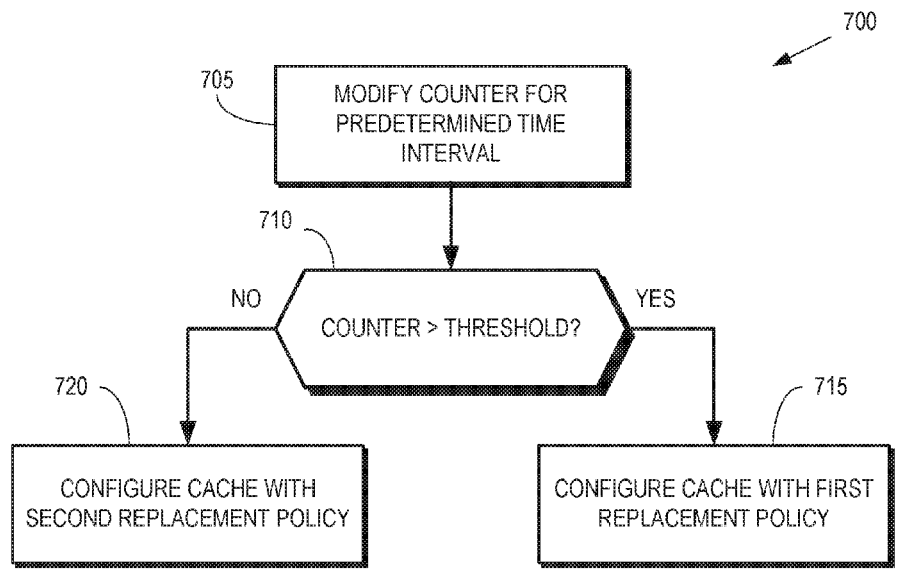
FIG. 7 is a flow diagram of a method of configuring a cache replacement policy based on a value of a set dueling counter according to some embodiments.

FIG. 7 is a flow diagram of a method 700 of configuring a cache replacement policy based on a value of a set dueling counter according to some embodiments. The method 700 is implemented in some embodiments of the processing system 100 shown in FIG. 1 or the processing system 3 shown in FIG. 3.

At block 705, a processor core monitors a first subset of a cache that is configured to operate using a first cache replacement policy and a second subset of the cache that is configured to operate using a second cache replacement policy. The processor core modifies a counter in response to cache hits or cache misses for a predetermined time interval. The amount of modification to the counter is determined based on characteristics of the memory access requests that cause the cache hits or the cache misses, as discussed herein.

At decision block 710, the processor core compares the value of the counter to a threshold value. If the value of the counter is greater than the threshold, which indicates that the first cache replacement policy was more effective over the predetermined time interval, the processor core configures (at block 715) the main portion of the cache to operate according to the first cache replacement policy. If the value of the counter is less than the threshold, which indicates that the second cache replacement policy was more effective over the predetermined time interval, the processor core configures (at block 720) the main portion of the cache to operate according to the second cache replacement policy. In some embodiments, the processor core evaluates the relative effectiveness of the first and second cache replacement policies (at decision block 710) based on other criteria that are applied to the value of the counter.

Figure 8:
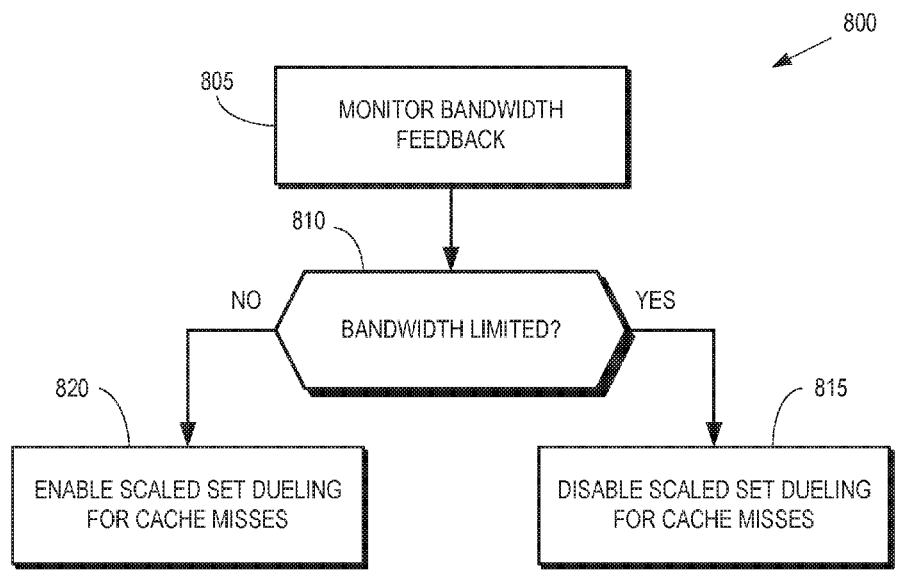
FIG. 8 is a flow diagram of a method for selectively enabling scaled set dueling using incremental values for a set to dueling counter that are determined based on characteristics of memory access requests according to some embodiments.

FIG. 8 is a flow diagram of a method 800 for selectively enabling scaled set dueling using incremental values for a set dueling counter that are determined based on characteristics of memory access requests according to some embodiments. The method 800 is implemented in some embodiments of the processing system 100 shown in FIG. 1 or the processing system 300 shown in FIG. 3.

At block 805, a processor core monitors bandwidth feedback from other entities in the processing system such as caches in the cache hierarchy of the processing system. For example, the processor core 110 shown in FIG. 1 monitors feedback indicating the current bandwidth usage associated with the local DRAM 115, the remote DRAM 120, the remote cache 125, the L3 cache 130, the L2 cache 135, the L1 caches 140-142, the instruction cache 145, the data cache 150, the TLB 160, or other entities in the processing system 100 shown in FIG. 1.

At decision block 810, the processor core determines whether the processing system (or some portion thereof) is bandwidth limited. If the processing system (or some portion thereof) is bandwidth limited, the processor core disables scaled set dueling for cache misses at block 815. Disabling scaled set dueling causes the set dueling counters to be incremented by the same value for all cache misses, regardless of the type of the memory access request or the latency associated with the cache miss. If the processing system is not bandwidth limited, the processor core enables scaled set dueling for cache misses at block 820. Enabling scaled set dueling allows the processor core to increment the set dueling counters by different values depending on characteristics of the memory access requests that generate cache hits or cache misses in the caches of the processing system.

In some embodiments, the apparatus and techniques described above are implemented in a system comprising one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a cache including cache lines that are partitioned into a first subset of the cache lines and second subsets of the cache lines;
at least one counter associated with the second subsets of the cache lines; and
a processor configured to modify the at least one counter in response to a cache hit associated with the second subsets, wherein the at least one counter is modified by an amount based on a degree of speculation of a memory access request that generated the cache hit, the degree of speculation based on at least one of: whether the memory access request is directed to an instruction cache or a data cache; and whether the cache hit is a result of a page table walk.

2. The apparatus of claim 1, wherein the processor further is configured to increment the at least one counter in response to a cache hit to a first one of the second subsets and decrement the at least one counter in response to a cache hit to a second one of the second subsets.

3. The apparatus of claim 2, wherein the processor is further configured to:
increment the at least one counter by an amount that is determined based on a degree of speculation of the memory access request that generated the cache hit to the first one of the second subsets, and
decrement the at least one counter by an amount that is determined based on a degree of speculation of the memory access request that generated the cache hit to the second one of the second subsets.

4. The apparatus of claim 1, wherein the processor is further configured to:
decrement the at least one counter in response to a cache miss associated with a first one of the second subsets; and
increment the at least one counter in response to a cache miss to a second one of the second subsets.

5. The apparatus of claim 4, wherein the processor is further configured to:
  decrement the at least one counter by an amount that is determined based on a latency associated with the cache miss associated with the first one of the second subsets; and
  increment the at least one counter by an amount that is determined based on a latency associated with the cache miss associated with the second one of the second subsets.

6. The apparatus of claim 5, wherein the processor is further configured to:
  decrement the at least one counter by the same amount for all cache misses associated with the first one of the second subsets in response to detecting bandwidth limited operation based on feedback indicating bandwidth consumption, and
  increment the at least one counter by the same amount for all cache misses associated with the second one of the second subsets in response to detecting the bandwidth limited operation.

7. The apparatus of claim 1, wherein:
  the second subsets use a corresponding plurality of cache replacement policies; and
  the processor is further configured to:
    select one of the plurality of cache replacement policies based on at least one value of the at least one counter; and
    configure the first subset to use the selected one of the plurality of cache replacement policies.

8. A method, comprising:
  partitioning cache lines into a first subset of the cache lines and second subsets of the cache lines;
  detecting a cache hit associated with the second subsets; and
  modifying at least one counter associated with the second subsets of the cache lines in response to the cache hit, wherein the at least one counter is modified by an amount based on a degree of speculation of a memory access request that generated the cache hit, the degree of speculation based on at least one of: whether the memory access request is directed to an instruction cache or a data cache; and whether the cache hit is a result of a page table walk.

9. The method of claim 8, wherein modifying the at least one counter comprises:
  incrementing the at least one counter in response to a cache hit to a first one of the second subsets, and
  decrementing the at least one counter in response to a cache hit to a second one of the second subsets.

10. The method of claim 9, wherein:
  incrementing the at least one counter comprises incrementing the at least one counter by an amount that is determined based on a degree of speculation of the memory access request that generated the cache hit to the first one of the second subsets; and
  decrementing the at least one counter comprises decrementing the at least one counter by an amount that is determined based on a degree of speculation of the memory access request that generated the cache hit to the second one of the second subsets.

11. The method of claim 8, wherein modifying the at least one counter further comprises:
  decrementing the at least one counter in response to a cache miss associated with a first one of the second subsets; and
  incrementing the at least one counter in response to a cache miss to a second one of the second subsets.

12. The method of claim 11, wherein:
  decrementing the at least one counter comprises decrementing the at least one counter by an amount that is determined based on a latency associated with the cache miss associated with the first one of the second subsets; and
  incrementing the at least one counter comprises incrementing the at least one counter by an amount that is determined based on a latency associated with the cache miss associated with the second one of the second subsets.

13. The method of claim 11, wherein:
  decrementing the at least one counter comprises decrementing the at least one counter by the same amount for all cache misses associated with the first one of the second subsets in response to detecting bandwidth limited operation based on feedback indicating bandwidth consumption; and
  incrementing the at least one counter comprises incrementing the at least one counter by the same amount for all cache misses associated with the second one of the second subsets in response to detecting the bandwidth limited operation.

14. The method of claim 8, wherein the second subsets use a corresponding plurality of cache replacement policies, the method further comprising:
  selecting one of the plurality of cache replacement policies based on at least one value of the at least one counter; and
  configuring the first subset to use the selected one of the plurality of cache replacement policies.

15. An apparatus, comprising:
  a cache including cache lines that are partitioned into a first subset and second subsets for storing information from a memory;
  at least one counter associated with the second subsets; and
  a processor configured to:
    selectively enable or disable set dueling to determine a cache replacement policy for the cache based on feedback indicating whether operation of at least one of the memory or the cache is bandwidth limited, wherein the set dueling chooses between first and second cache replacement policies implemented by the first and second subsets, respectively, on the basis of the at least one counter; and
    modify the at least one counter in response to a cache hit associated with the second subsets, wherein the at least one counter is modified by an amount based on a degree of speculation of a memory access request that generated the cache hit, the degree of speculation based on at least one of: whether the memory access request is directed to an instruction cache or a data cache; and whether the cache hit is a result of a page table walk.

16. The apparatus of claim 15, wherein:
  the processor is further configured to modify the at least one counter in response to at least one of a cache hit or a cache miss associated with the second subsets; and
  the at least one counter is modified by an amount based on at least one characteristic of a memory access request that generated the at least one of the cache hit or the cache miss.

17. The apparatus of claim 15, wherein the processor is further configured to disable set dueling in response to detecting bandwidth limited operation based on feedback indicating bandwidth consumption by at least one of the memory or the cache.

18. The apparatus of claim 17, wherein the processor is further configured to:
- decrement the at least one counter by the same amount for all cache misses associated with a first one of the second subsets in response to detecting the bandwidth limited operation; and
- increment the at least one counter by the same amount for all cache misses associated with a second one of the second subsets in response to detecting the bandwidth limited operation.

19. The apparatus of claim 15, wherein the degree of speculation is based on whether the memory access request is directed to an instruction cache or a data cache.

20. The apparatus of claim 15, wherein the degree of speculation is based on whether the cache hit is a result of a page table walk.

* * * * *